United States Patent Office 2,720,560
Patented Oct. 11, 1955

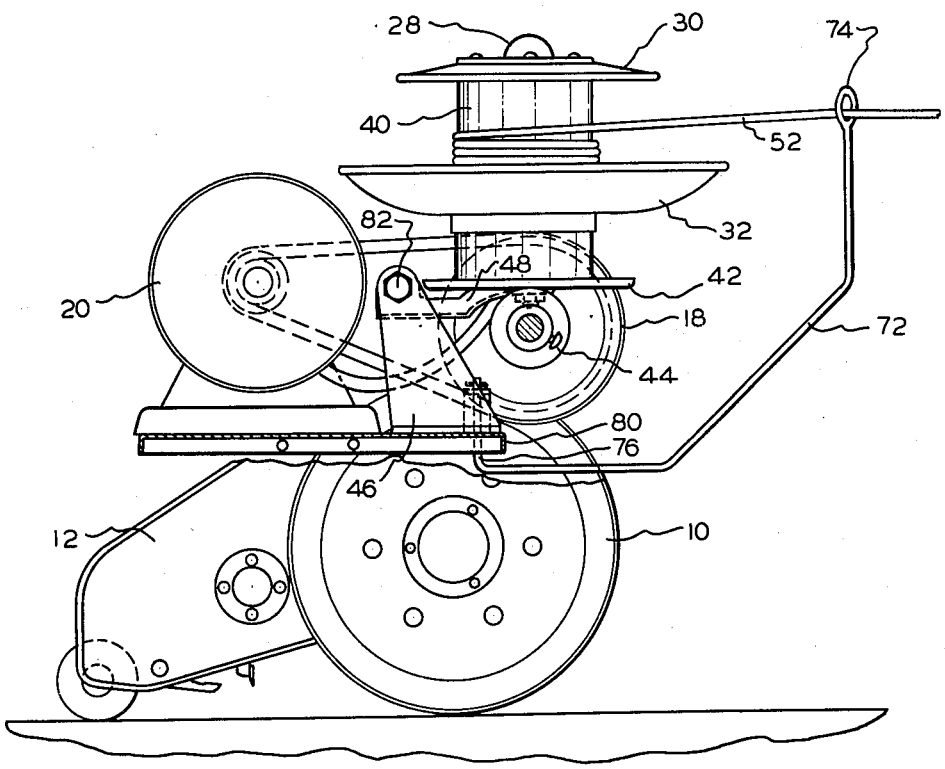
FIG. I.
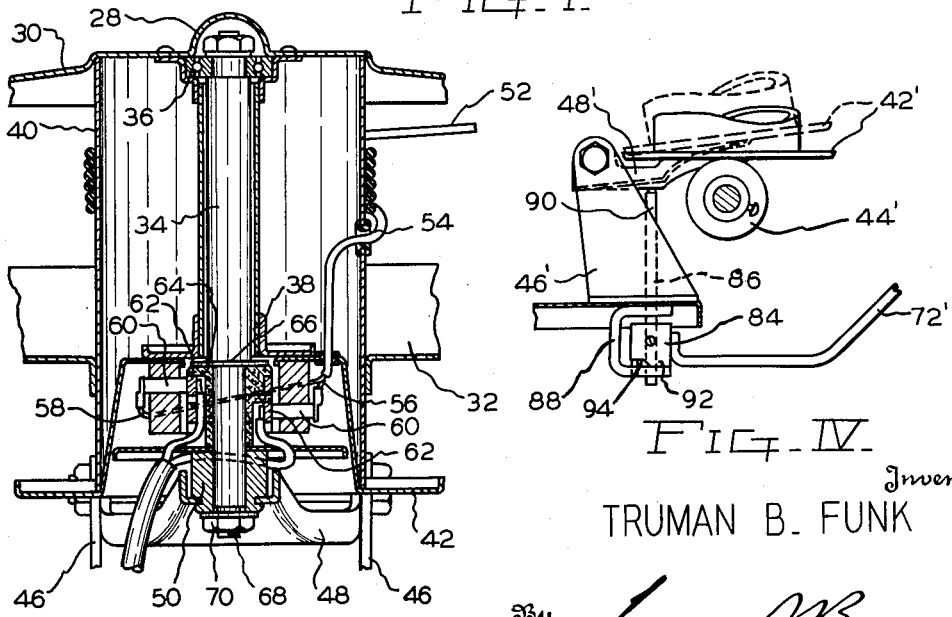
FIG. III.
FIG. IV.
Inventor
TRUMAN B. FUNK

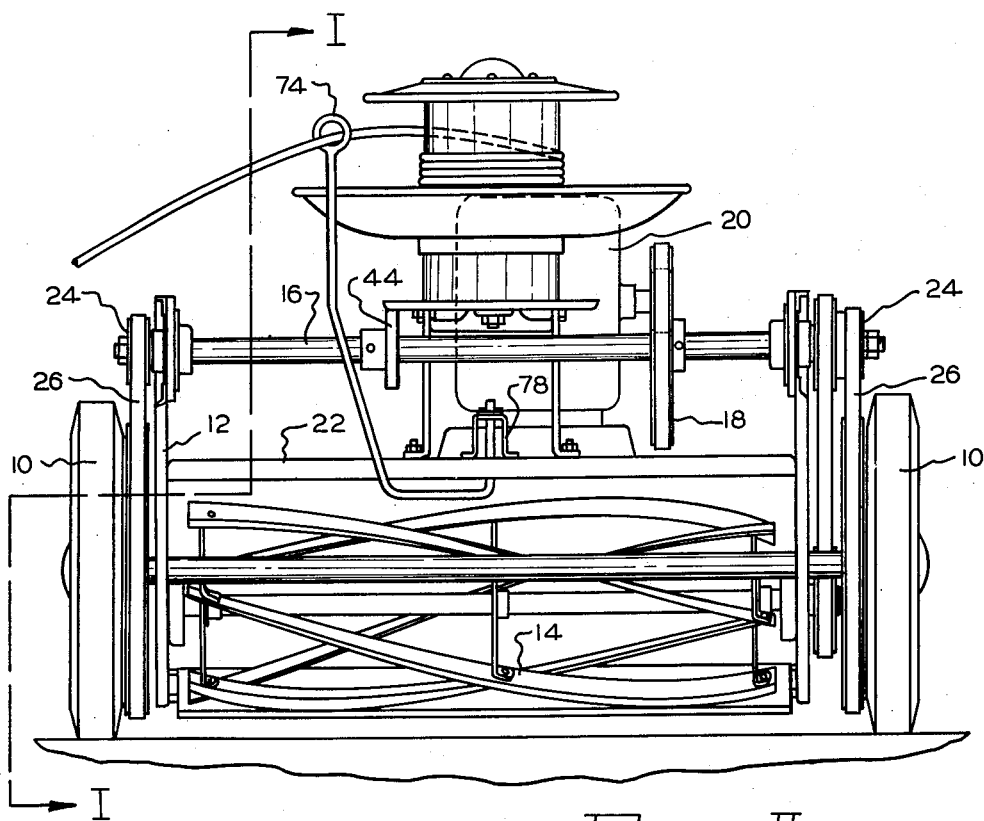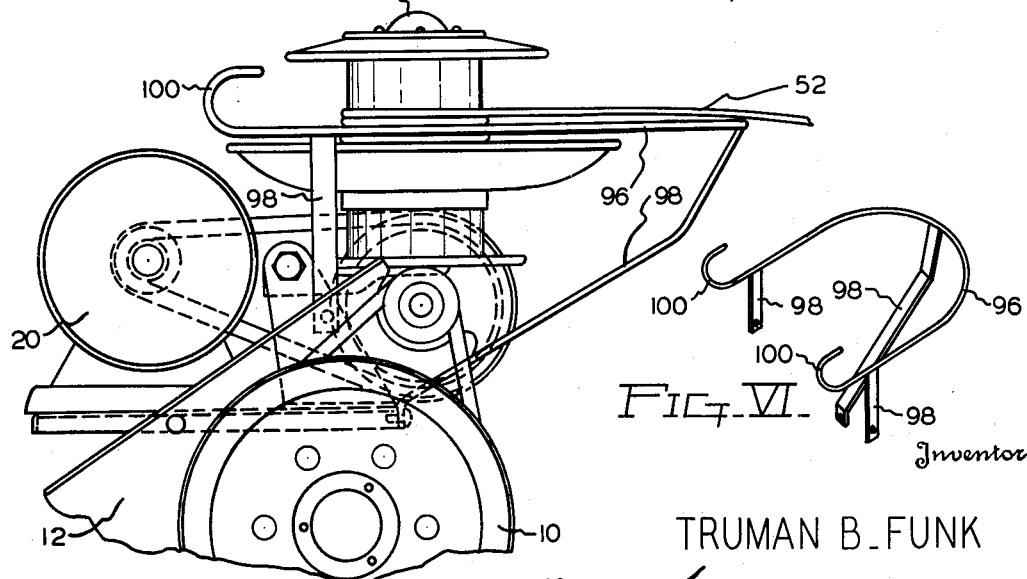

2,720,560

ELECTRIC CORD HANDLING APPARATUS

Truman B. Funk, Jackson, Mich., assignor to Yard-Man, Inc., Jackson, Mich., a corporation of Michigan Application November 25, 1949, Serial No. 129,485

5 Claims. (Cl. 191—12.2)

The present invention relates to improvement in lawn mowers and has particular reference to power lawn mowers of the type which are guided over the ground by an operator walking behind the mower and traversing the cut swath.

Electrically powered lawn mowers have many desired characteristics and have gone into limited commercial use. One of the principal objections to the electric lawn mower and one of the factors which has retarded its adoption concerns the difficulties experienced in connection with the manipulation of the electrical conducting cord extending from some convenient outlet to the electric motor mounted upon the lawn mower chassis.

It is an object of the present invention to provide an improved electrically driven lawn mower in which there has been embodied a practical provision for the automatic reeling of the electric cord.

Another object of the invention is to provide an improved cord manipulating attachment for electric lawn mowers and the like, it being anticipated that the principles of the present invention are equally well adapted to cleaners and sweepers and similar devices which are electrically driven and guided over the ground or floor in a manner comparable to a lawn mower.

A further object of the present invention is to provide an improved cord reeling and manipulating device especially adapted to electrically driven lawn mowers manually guided and other similar devices.

A still further object of the invention is to provide a reeling and cord manipulating device of the type described in which there is a continuous tension maintained upon the electrical cord tending to wrap the same upon the reel.

A still further object of the invention is to provide a cord manipulating device for electrically powered lawn mowers and the like in which the cord is automatically positioned on one side or the other of the device and operator.

These and other objects and advantages residing in the combination, arrangement and construction of the parts will more fully appear from a detailed consideration of the following specification and claims.

In the drawings:

Fig. I is a side elevational view of an electric lawn mower equipped with the present invention, Fig. II is a front elevational view of Fig. I, Fig. III is a cross-sectional view through the reel and electrical commutator structure, Fig. IV is a fragmentary view of a modified form of the invention, Fig. V is a view similar to Fig. I of a modification of the invention, and Fig. VI is a perspective view of one of the elements of Fig. V.

Referring to the drawings, the lawn mower, of any conventional design, as illustrated, comprises ground wheels 10, spaced in a frame 12 in which a revolving reel 14 is located. Supported in the frame 12 is a countershaft 16 bearing a pulley 18 driven from the motor 20 on the platform 22.

Pulleys 24 on the ends of the shaft 16 drive the wheels 10 through the belts 26. The structure just described is well known in the art and forms no part in the present invention. It is also to be understood that the present invention is not restricted to its use on lawn mowers or other similar electrically driven devices of the construction illustrated in Figs. I and II but is considered to have general application to numerous forms of devices in which the automatic manipulation of the electric cord to the motor is desirable.

As more clearly shown in Figs. I to III, my improved reel and cord manipulating device for electrically driven apparatus of the type described, comprises a reel 28 firmly mounted for rotation around a substantially vertical axis and comprising radial flange portions 30 and 32. As shown, the flange portion 32 is of substantial radial disc shape, and is of slightly dished shaped construction. The reel 28 is supported for rotation upon the axle 34 on suitable bearings 36 and 38. The hub 40 of the reel 28 extends below the flange 32 and supports a driving flange 42 which is adapted to engage with the drive roller 44 located and driven by the shaft 16.

Spaced vertical bracket 46 supported from the platform 22 gives pivotal support to the member 48 in which a bushing 50 is provided to receive the lower end of an axle 34 and to provide support therefor.

The cord 52 enters the hub 40 which supports the bushing 54 with the conductors 56 and 58 being suitably connected in any well-known manner to the brushes 60 which are disposed in relation and are adapted to engage with commutator rings 62 carried in a spacing sleeve 64 positioned between the bushings 50 and the shoulder 66 on the axle 34. As shown the axle 34 is threaded at 68 to receive a suitable nut 70 which functions to assemble the axle 34 and sleeve 64 to the pivotal member 48 and supports the reel 28 for pivotal movement relative to the drive roller 44.

In form of the invention illustrated in Figs. I to III, the cord manipulating structure comprises an arm 72 with an eye 74 at one end to receive the cord 52 and a swivel end portion 76 at the opposite end centrally supported in the frame 12 on a suitable mounting 78. The eye 74 is shown positioned in substantially the same horizontal plane as the reel 28.

To position the cord 52 upon either side of the lawn mower and the path of the operator when the mower is being operated in a direction away from the electrical outlet, the horizontal distance from the eye 74 to the vertical axis of rotation of the end 76 is such as to position the eye 74 a substantial distance to either side of the longitudinal axis of the mower when the arm 72 is at the extreme ends of its arc of movement. As illustrated, the arm 72 is able to swing through substantially 180° before engagement takes place between the angular portion of the arm 72 and the edge 80 of the platform 22.

As the weight of the reel 28 is forward of its horizontal pivotal support 82, the driven flange 42 will have frictional contact at all times with the drive roll 44 which is tending to wind the cord 52 upon the hub 40. When the mower is being propelled away from the electrical outlet, the tension of the cord on the eye 74 will swing the arm 72 to the right or left of the longitudinal axis of the mower to lay the cord out of the path traversed by the operator. At the same time the tension on the cord is causing the reel 28 to rotate in a direction counter to the direction of the driving action of the roll 44.

When the mower is being operated in a direction having a component toward the electrical outlet, the slack in the cord 52 will be wound upon the reel 28 as rapidly as the tension on the cord 52 will permit the drive roller 44 to rotate the reel 28. Under such condition, the combination of the tension on the cord due to the rewinding operation and the supporting action of the eye 74, results in the cord 52 being wound upon the reel 28 without any attention or manipulation by the operator. It will be understood that the arm 72 is free to swivel within the limits of the substantially 180° arc, heretofore described. For example when the mower is being operated in a direction directly toward the electrical outlet, the eye 74 will be disposed along the longitudinal axis of the mower to support the cord 52 above the cutting reel 14, with the reel 28 under the drawing influence of the roll 44 taking up the slackened cord 52 at a rate corresponding to the rate of advancement of the mower toward the electrical outlet.

In Fig. IV is a modified arrangement in which the arm 72' is attached to a cam follower 84 supported for swivel movement about the axis of the shaft 86 to which it is connected. The shaft 86 is guided for axial movement in holes in the bracket 88 with the upper end 90 engageable with the member 48' to lift the driving flange 42' from the drive roll 44'. Vertical movement of the shaft 86 results from the swinging movement of the arm 72' which brings the cam follower portion 92 into engagement with the cam portion 94 fixed to the bracket 88 to lift the shaft 86. It will be understood that the portion 92 only engages the cam portion 94 with the arm 72' in a position it assumes when the cord reel is being rotated counter to the direction it is driven by the roll 44' by the tension on the cord as when the mower is being operated in a direction away from the electrical outlet.

In Figs. V and VI an arrangement is shown in which the swivel arm 72 of Fig. I has been replaced by a fixed cord guide frame 96, preferably of wire, supported by straps 78 attached to the mower frame in any suitable manner, to embrace the front and sides of the reel 28 to provide support for the cord 52 over an area corresponding to the arc of support provided by the eye 74. It will be understood that as the direction of tension on the cord 52 changes, the cord 52 will slide along the frame 96 with movement being arrested at the extremities by the hook portions 100. With the cord 52 extending to the reel 28 and engaging with either one of the hook portions 100, the portion of the cord extending toward the electrical outlet will be disposed substantially to one side of the operator guiding the lawn mower over the ground in the usual manner.

Having thus described my invention what I claim as new and desire to cover by Letters Patent is:

1. In combination with a lawn mower having ground wheels behind and between which the operator walks in guiding the lawn mower over the ground and an electric motor for operating the lawn mower, a reel, means supporting said reel for rotation about a substantially vertical axis, an electrical cord adapted to be wound upon the reel and to be connected to an electrical outlet for conducting energy to said motor, a drive member operated by said motor, driven means associated with said reel, and means for supporting said reel supporting means for pivotal movement about a horizontal axis to bring said driven means into frictional driving relation to said drive member.

2. A lawn mower as defined in claim 1 wherein guiding means supported for movement in a horizontal plane is provided for said cord for disposing the cord extending to the outlet to either side of the path traversed by the operator.

3. A lawn mower as defined in claim 1 wherein cord manipulating means are provided for disposing the cord upon either side of the path traversed by the operator, and means associated with said cord manipulating means and actuated by the tension of the cord upon said means for separating said drive and driven means with the tension upon the cord while the cord is being unwound on the reel.

4. An electrically driven lawn mower comprising a frame, an electric motor on the frame, a shaft driven by said motor, a friction drive on said shaft, an electric cord reel including a driven member adapted to be rotated about a substantially vertical axis in one direction by said drive to wind slack cord upon said reel, means supported from said frame to support said reel for bodily movement to bring said driven member into engagement with said drive, an electrical conductor cord wound upon said reel and electrically connected to said motor, said friction drive enabling said reel to rotate counter to the direction of drive to unwind said cord on exertion of sufficient tension thereon to overcome the friction drive.

5. In combination with an electrical cord reel for electrically driven devices such as lawn mowers and the like, which in use are manually guided by a following operator and have ground supported structure upon which the reel is carried, a cord supporting element having a cord guide, means supporting said element for pivotal movement about a vertical axis and attached to the said ground supported structure, an electrical cord having one end wound upon said reel and an intermediate portion of said cord having a free running engagement with said cord guide, said cord guide being horizontally spaced from said vertical axis to give support to said cord to either side of said reel upon pivotal movement of said element whereby the cord is disposed to either side of the path traversed by the operator.

References Cited in the file of this patent

UNITED STATES PATENTS

| | | |
|---|---|---|
| 2,359,123 | Krapf | Sept. 26, 1944 |
| 2,450,257 | Simmons | Sept. 28, 1948 |
| 2,498,609 | Reil | Feb. 21, 1950 |
| 2,566,512 | Bilderbeck | Sept. 4, 1951 |